United States Patent
Kawamura

(10) Patent No.: US 10,620,791 B2
(45) Date of Patent: Apr. 14, 2020

(54) INFORMATION PROCESSING APPARATUS AND OPERATION RECEPTION METHOD

(71) Applicant: SONY INTERACTIVE ENTERTAINMENT INC., Tokyo (JP)

(72) Inventor: Daisuke Kawamura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/780,003

(22) PCT Filed: Dec. 9, 2016

(86) PCT No.: PCT/JP2016/086795
§ 371 (c)(1),
(2) Date: May 30, 2018

(87) PCT Pub. No.: WO2017/104579
PCT Pub. Date: Jun. 22, 2017

(65) Prior Publication Data
US 2018/0348969 A1   Dec. 6, 2018

(30) Foreign Application Priority Data
Dec. 17, 2015 (JP) ................. 2015-246485

(51) Int. Cl.
*G06F 3/0482* (2013.01)
*G06F 3/0346* (2013.01)
(Continued)

(52) U.S. Cl.
CPC ....... *G06F 3/0482* (2013.01); *G02B 27/0172* (2013.01); *G06F 3/011* (2013.01);
(Continued)

(58) Field of Classification Search
CPC .... G06F 3/0482; G06F 3/04842; G06F 3/017; G06F 3/012; G06F 3/011; G06F 3/04815;
(Continued)

(56) References Cited

U.S. PATENT DOCUMENTS

| 5,898,435 A |  | 4/1999 | Nagahara et al. |
| 8,893,045 B2 | * | 11/2014 | Sakaeda ............... H04N 21/431 |
|  |  |  | 715/835 |

(Continued)

FOREIGN PATENT DOCUMENTS

| JP | 7-64709 A | 3/1995 |
| JP | 7-271546 A | 10/1995 |

(Continued)

OTHER PUBLICATIONS

International Search Report and Written Opinion dated Feb. 14, 2017, from the corresponding International Application No. PCT/JP2016/086795, 10 sheets.

(Continued)

*Primary Examiner* — Ajay M Bhatia
*Assistant Examiner* — Mong-Shune Chung
(74) *Attorney, Agent, or Firm* — Katten Muchin Rosenman LLP

(57) ABSTRACT

Icons 514a and 514b are disposed so as to cross a circumference 512 that is positioned around a head of a user 516 and in a horizontal plane including a line-of-sight vector prevailing when the user 516 faces forward in a virtual space. In this instance, icons 514a whose center is above the circumference 512 and icons 514b whose center is below the circumference 512 are alternately disposed. A menu screen is drawn by identifying a normal vector 517 of the face of the user as a line of sight in accordance with posture information related to the user's head, setting a screen 518

(Continued)

in a vertical plane around the line of sight, and projecting a virtual space object onto the screen 518.

8 Claims, 10 Drawing Sheets

(51) Int. Cl.
*G06F 3/01* (2006.01)
*G06F 3/0484* (2013.01)
*G02B 27/01* (2006.01)
*G06F 3/0481* (2013.01)

(52) U.S. Cl.
CPC .............. *G06F 3/012* (2013.01); *G06F 3/017* (2013.01); *G06F 3/0346* (2013.01); *G06F 3/04812* (2013.01); *G06F 3/04815* (2013.01); *G06F 3/04817* (2013.01); *G06F 3/04842* (2013.01); *G02B 2027/014* (2013.01); *G02B 2027/0178* (2013.01)

(58) Field of Classification Search
CPC ............. G06F 3/04812; G06F 3/04817; G06F 3/0346; G02B 27/0172; G02B 2027/0178; G02B 2027/014
See application file for complete search history.

(56) References Cited

U.S. PATENT DOCUMENTS

| 2007/0296646 | A1* | 12/2007 | Yamamoto | G02B 27/017 |
| | | | | 345/8 |
| 2011/0131296 | A1* | 6/2011 | Lee | G06F 3/017 |
| | | | | 709/219 |
| 2013/0106674 | A1 | 5/2013 | Wheeler et al. | |
| 2014/0223343 | A1* | 8/2014 | Lee | G06F 3/04817 |
| | | | | 715/765 |
| 2015/0067580 | A1 | 3/2015 | Um et al. | |
| 2015/0312559 | A1* | 10/2015 | Ueno | H04N 13/275 |
| | | | | 348/53 |
| 2016/0026253 | A1* | 1/2016 | Bradski | G02B 27/225 |
| | | | | 345/8 |

FOREIGN PATENT DOCUMENTS

| JP | 07271546 A | * 10/1995 |
| JP | 9-97162 A | 4/1997 |
| JP | 2003-196017 A | 7/2003 |
| JP | 2008-33891 A | 2/2008 |
| JP | 2010-218195 A | 9/2010 |
| JP | 2014-72576 | 4/2014 |
| WO | 00/11540 | 3/2000 |

OTHER PUBLICATIONS

International Preliminary Report on Patentability dated Jun. 19, 2018, from International Application No. PCT/JP2016/086795, 17 sheets.

Japanese Office Action dated May 7, 2019, from the Japanese Application No. 2015-246485, 2 sheets.

* cited by examiner

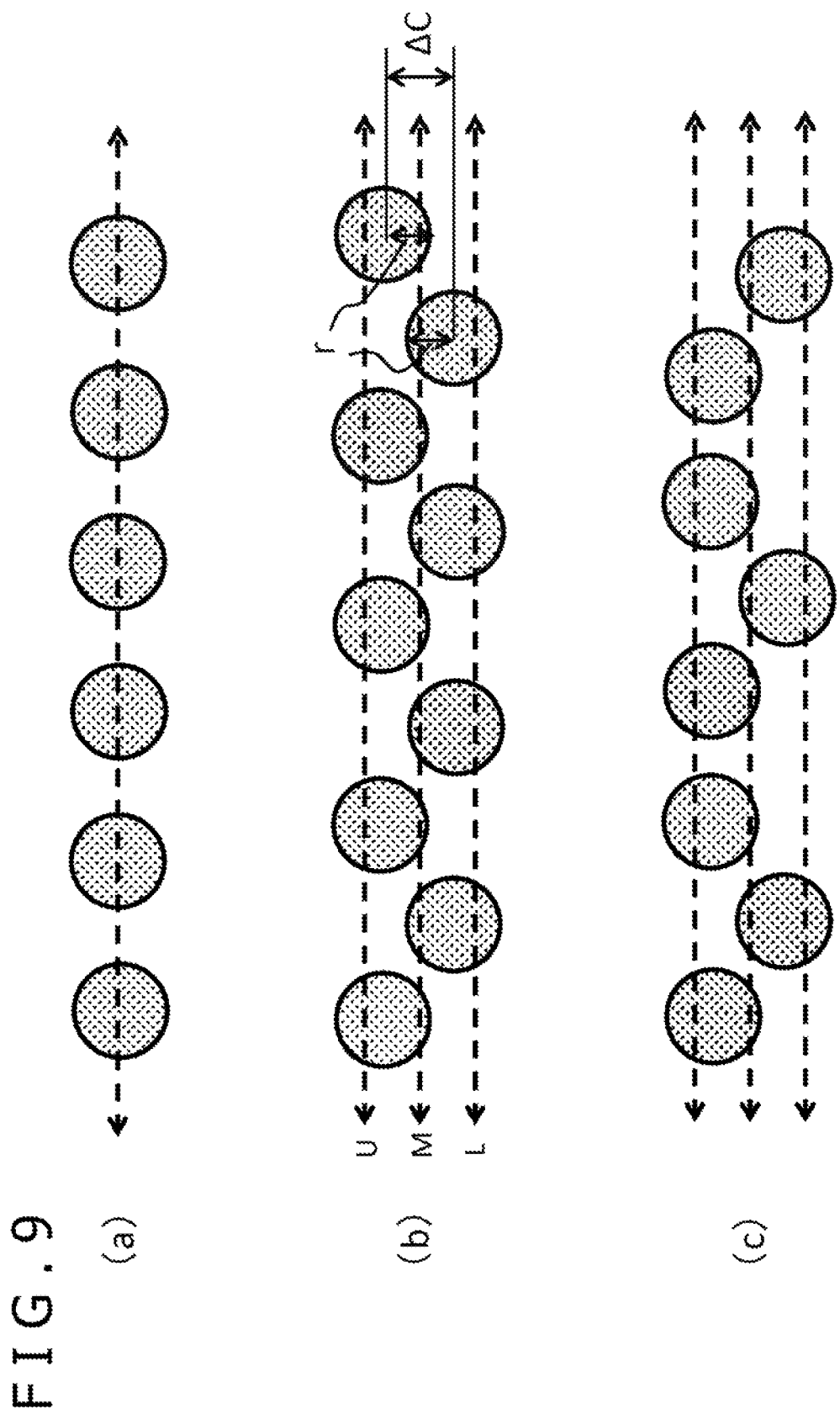

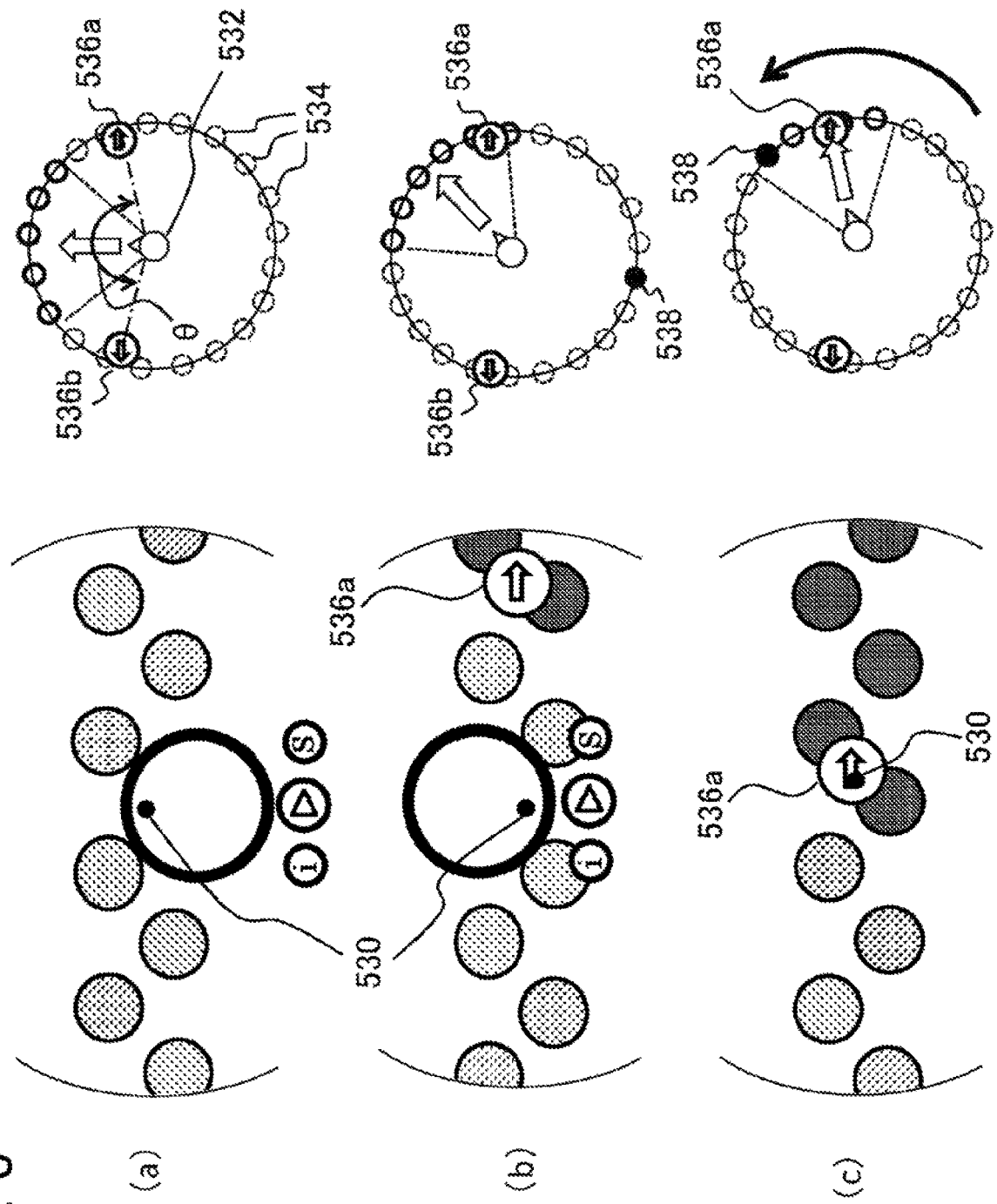

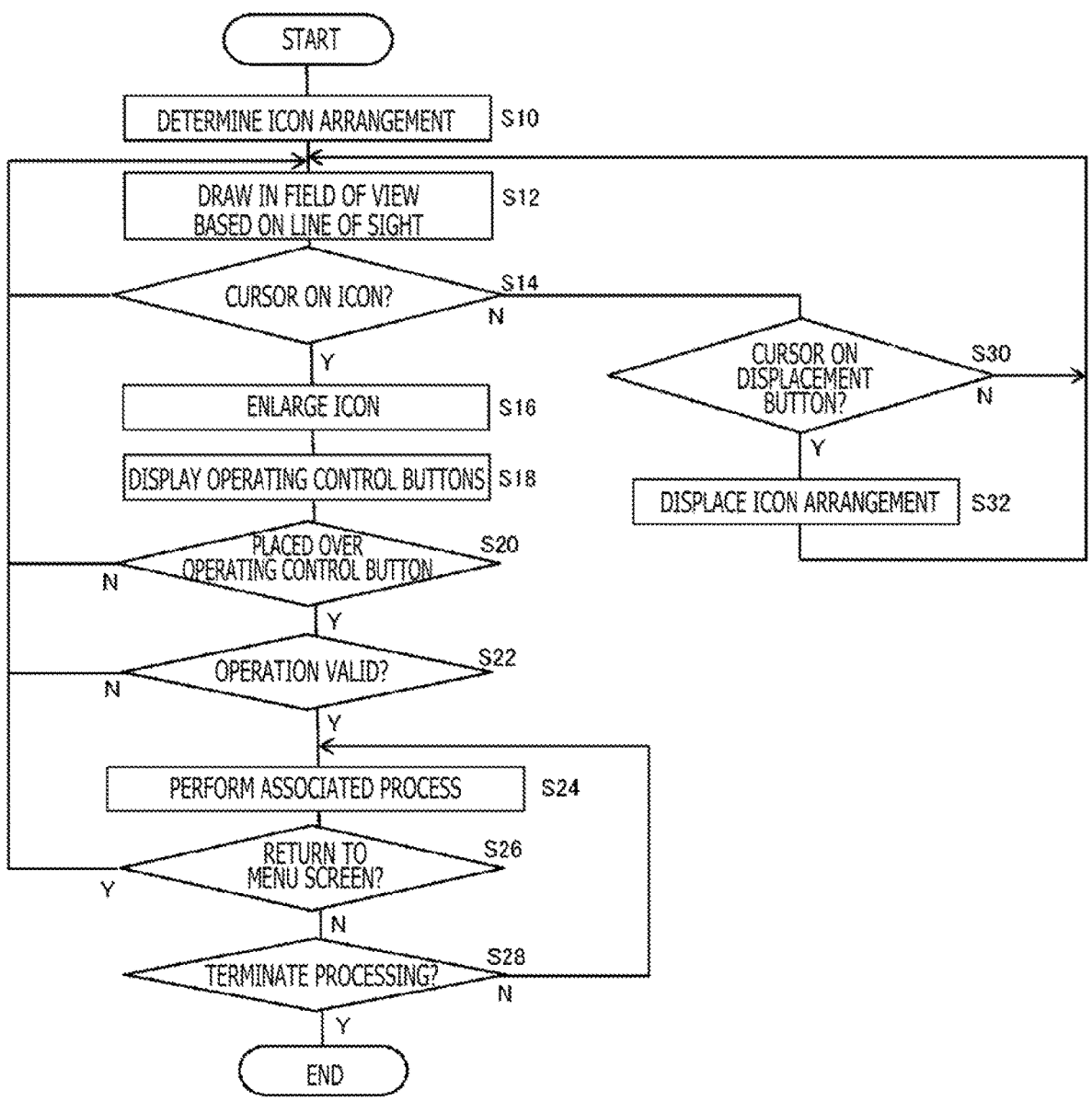

INFORMATION PROCESSING APPARATUS AND OPERATION RECEPTION METHOD

TECHNICAL FIELD

The present invention relates to an information processing apparatus that performs information processing through interaction with a user. The present invention also relates to an operation reception method that is applied by the information processing apparatus.

BACKGROUND ART

There is a known game in which the image of a user's body or a marker is captured by a camera, a region of the captured image is replaced by another image, and the resulting image is displayed on a display. A technology for analyzing not only captured images but also values measured by various sensors attached to or gripped by a user and reflecting the results of analysis in information processing, for example, for a game is used in a wide range of fields, from small-size game machines to leisure facilities, irrespective of their scales.

For example, a certain developed system displays a panoramic image on a head-mounted display. When a user wearing the head-mounted display rotates the user's head, this system displays a panoramic image based on the direction of the user's line of sight. Using the head-mounted display enhances the sense of immersion and improves the operability of a game or other application. In addition, a walk-through system is developed. When a user wearing the head-mounted display physically moves, the walk-through system allows the user to virtually walk in a space displayed as an image.

SUMMARY

Technical Problems

Particularly while a user is wearing a head-mounted display or other wearable display, it is difficult for the user to operate a controller, a keyboard, or other input device to input operation information to the system. Further, even when panoramic images and stereoscopic images are used without regard to the type of display device to achieve sophisticated image representation for providing the sense of immersion in a virtual space, the user becomes disinterested if electronic content, such as moving images and games, is displayed by employing a simple screen configuration or a menu or setup screen requiring the use of the aforementioned input device for selecting specific electronic content. Therefore, demanded is a technology that displays such an operation reception screen while maintaining a view of the world expressed by a virtual space without sacrificing ease of operation.

The present invention has been made in view of the above circumstances. An object of the present invention is to provide a technology for displaying an operation reception screen while maintaining ease of operation and a view of the world expressed by a virtual space.

Solution to Problems

In order to solve the above problems, an aspect of the present invention relates to an information processing apparatus. The information processing apparatus generates a menu screen including a plurality of icons and receives a selection operation performed by a user. The information processing apparatus includes an icon arrangement section, a field-of-view control section, an image generation section, and an operation determination section. The icon arrangement section arranges the plurality of icons in a virtual space. The field-of-view control section acquires posture information related to a head of the user, and determines a field-of-view plane with respect to the virtual space in accordance with the acquired posture information. The image generation section draws an image to be projected into the virtual space with respect to the field-of-view plane, generates the menu screen over which a cursor indicating point of view of the user is displayed, and outputs the generated menu screen to a display device. The operation determination section identifies an operation in accordance with a positional relationship between the cursor and the icons and other object images drawn on the menu screen. The icon arrangement section arranges the icons in a horizontal direction of the virtual space in such a manner that a center of at least one icon is vertically displaced from a center of another icon.

Another aspect of the present invention relates to an operation reception method. The operation reception method is applied by an information processing apparatus that generates a menu screen including a plurality of icons and receives a selection operation performed by a user. The operation reception method includes the steps of arranging the icons in a virtual space, acquiring posture information related to a head of the user and determining a field-of-view plane with respect to the virtual space in accordance with the acquired posture information, drawing an image to be projected into the virtual space with respect to the field-of-view plane, generating the menu screen over which a cursor indicating point of view of the user is displayed, and outputting the generated menu screen to a display device, and identifying an operation in accordance with a positional relationship between the cursor and the icons and other object images drawn on the menu screen. The step of arranging the icons is arranging the icons in a horizontal direction of the virtual space in such a manner that a center of at least one icon is vertically displaced from a center of another icon.

Various combinations of the aforementioned elements and conversions of expressions of the present invention into methods, apparatuses, systems, computer programs, data structures, recording media, and the like are also intended to constitute applicable embodiments of the present invention.

Advantageous Effect of Invention

The present invention provides an operation reception screen that maintains ease of operation and a view of the world expressed by a virtual space.

BRIEF DESCRIPTION OF DRAWINGS

FIG. 9 depicts a set of schematic diagrams illustrating the relationship between icon arrangement and point-of-view movement in the embodiment.

FIG. 10 depicts a set of diagrams illustrating exemplary menu screen transitions including icon arrangement displacement operations in the embodiment.

FIG. 11 is a flowchart illustrating processing steps that are performed by the information processing apparatus according to the embodiment in order to generate a menu screen and receive a selection operation.

DESCRIPTION OF EMBODIMENT

An embodiment described below displays a menu screen and other selection operation reception screens while changing the field of view in accordance with the movement of the line of sight of a user. In that sense, the type of image display device is not specifically limited. For example, a wearable display, a flat panel display, or a projector may be used as the image display device. However, the following description assumes that a head-mounted display, which is a wearable display, is used as the image display device.

When a wearable display is used, the user's line of sight can be roughly estimated by a built-in motion sensor. If any other display device is used, the line of sight can be detected when a motion sensor is mounted on the head of the user or the reflection of infrared light is detected by a gaze point detector. Alternatively, an image showing the appearance of the user with a head-mounted marker may be captured and analyzed to estimate the line of sight. Another alternative is to combine some of the above-mentioned technologies.

Figure 1:
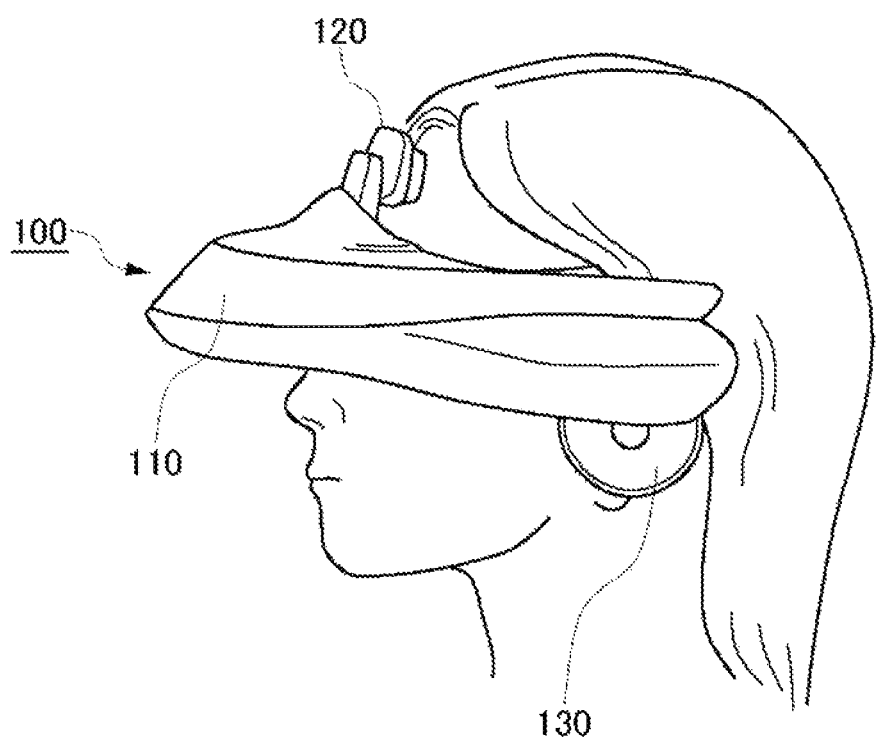
FIG. 1 is an external view illustrating a head-mounted display according to an embodiment of the present invention.

FIG. 1 is an external view illustrating a head-mounted display 100. The head-mounted display 100 includes a main body section 110, a front head contact section 120, and a lateral head contact section 130. The head-mounted display 100 is a display device that is mounted on the user's head to let the user appreciate, for example, a still image or a moving image displayed on the display and listen, for example, to sound and music outputted from a headphone. A motion sensor built in or externally attached to the head-mounted display 100 is capable of measuring posture information, such as the rotation angle and inclination of the user's head on which the head-mounted display 100 is mounted.

The head-mounted display 100 is an example of a "wearable display device." The wearable display device is not limited to the head-mounted display 100 in a narrow sense, but may be any other arbitrary wearable display device such as a pair of eyeglasses, an eyeglass-mounted display, an eyeglass-mounted camera, a headphone, a headset (a headphone with a microphone), an earphone, an earring, an ear-mounted camera, a cap, a cap-mounted camera, or a hairband.

Figure 2:
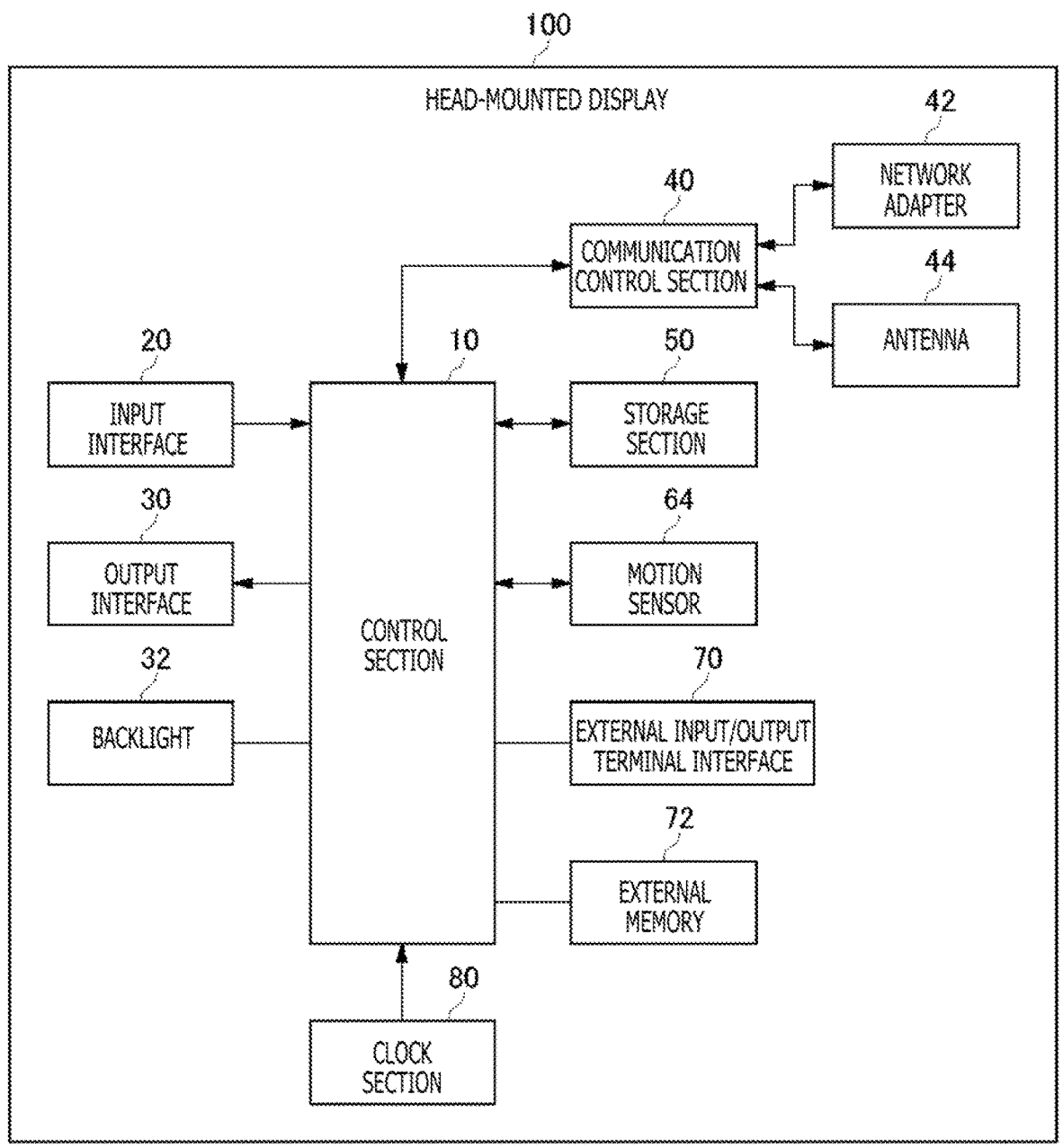
FIG. 2 is a diagram illustrating a functional configuration of the head-mounted display according to the embodiment.

FIG. 2 is a diagram illustrating a functional configuration of the head-mounted display 100. A control section 10 is a main processor that processes and outputs instructions, data, and signals such as an image signal and a sensor signal. An input interface 20 receives an operating control signal and a setup signal from the user, and supplies the received signals to the control section 10. An output interface 30 receives an image signal from the control section 10, and displays the received image signal on the display. A backlight 32 provides backlight illumination to the liquid-crystal display.

A communication control section 40 establishes wired or wireless communication through a network adapter 42 or an antenna 44 to transmit data inputted from the control section 10 to the outside. Further, the communication control section 40 establishes wired or wireless communication through the network adapter 42 or the antenna 44 to receive data from the outside and output the received data to the control section 10. A storage section 50 temporarily stores, for example, data, parameters, and operating control signals to be processed by the control section 10.

A motion sensor 64 detects posture information, for example, about the rotation angle and inclination of the main body section 110 of the head-mounted display 100. The motion sensor 64 is implemented by an appropriate combination, for example, of a gyro sensor, an acceleration sensor, and an angular acceleration sensor. An external input/output terminal interface 70 is an interface for connecting a peripheral equipment such as a universal serial bus (USB) controller. An external memory 72 is an external memory such as a flash memory.

A clock section 80 sets time information in accordance with a setup signal from the control section 10, and supplies time data to the control section 10. The control section 10 is capable of supplying images and text data to the output interface 30 to display them on the display, and supplying them to the communication control section 40 to let it transmit them to the outside.

Figure 3:
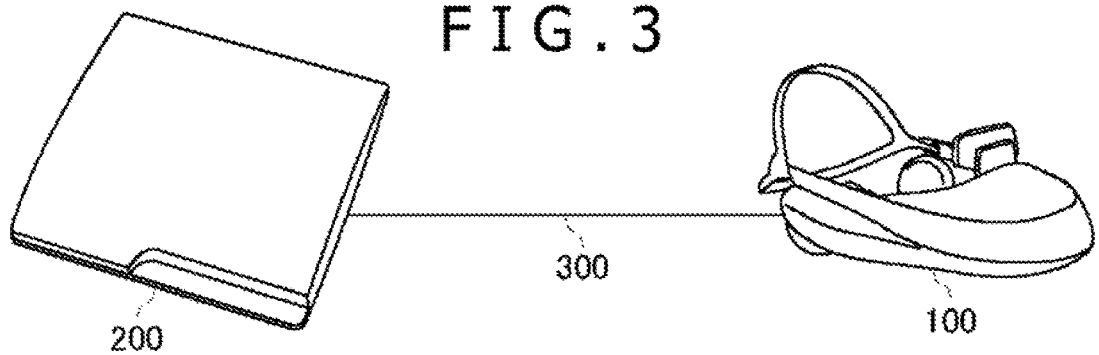
FIG. 3 is a diagram illustrating a configuration of an information processing system according to the embodiment.

FIG. 3 is a diagram illustrating a configuration of an information processing system according to the present embodiment. The head-mounted display 100 is connected to an information processing apparatus 200 by means of wireless communication or an interface 300 for connecting a USB or other peripheral equipment. The information processing apparatus 200 may be further connected to a server through a network. In such an instance, the server may supply to the information processing apparatus 200 an online application such as a game in which a plurality of users can participate through a network. The head-mounted display 100 may be connected to a computer or a mobile terminal instead of the information processing apparatus 200.

The head-mounted display 100 may display a pre-captured 360-degree panoramic still image or panoramic moving image or an artificial panoramic image such as an image of a game space. The head-mounted display 100 may also display a remote live image distributed through a network. However, the present embodiment is not limited to the display of a panoramic image. Whether or not to display a panoramic image may be determined as appropriate depending on the type of display device.

Figure 4:
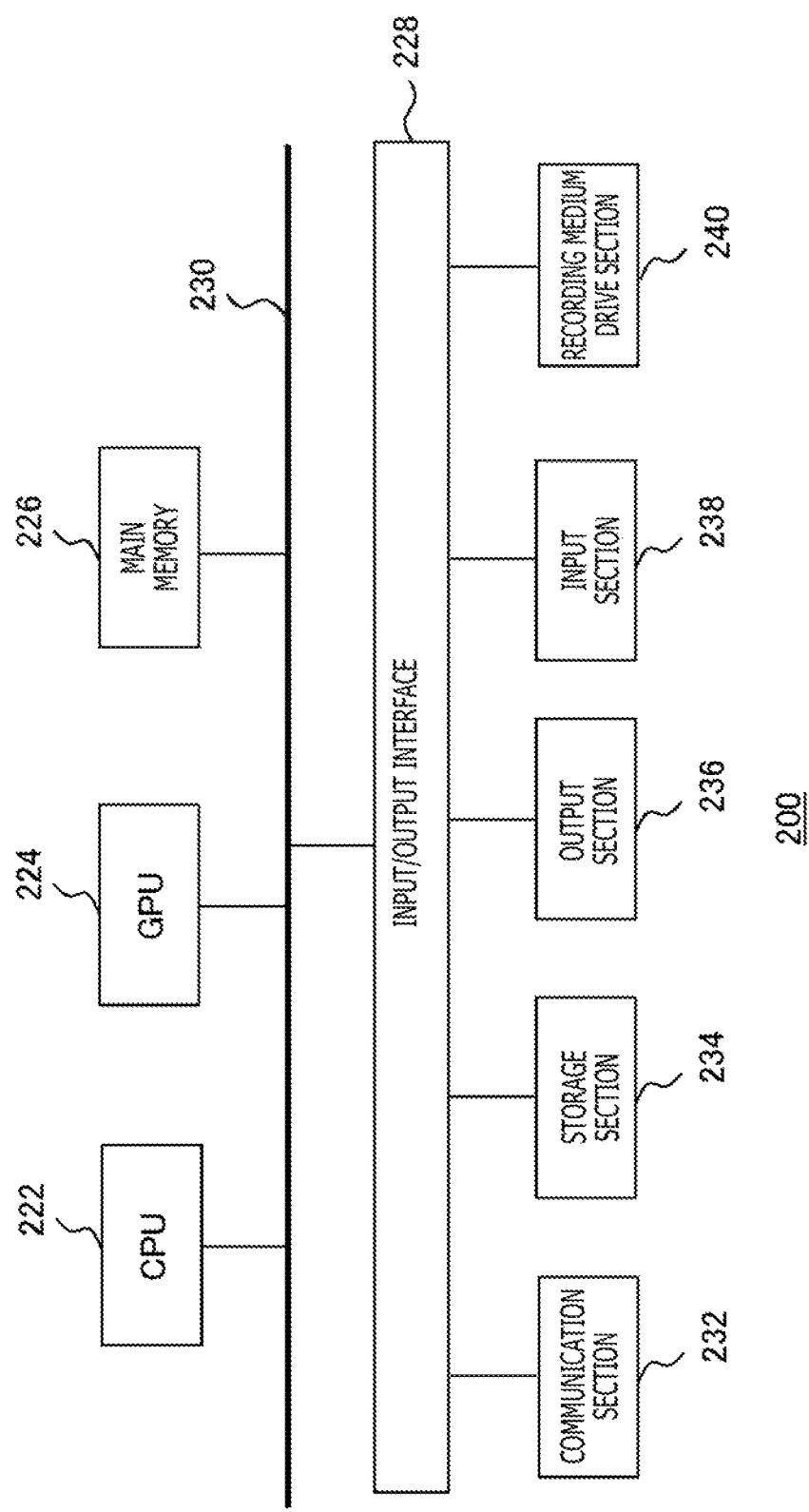
FIG. 4 is a diagram illustrating an internal circuit configuration of an information processing apparatus according to the embodiment.

FIG. 4 illustrates an internal circuit configuration of the information processing apparatus 200. The information processing apparatus 200 includes a central processing unit (CPU) 222, a graphics processing unit (GPU) 224, and a main memory 226. These elements are interconnected through a bus 230. The bus 230 is further connected to an input/output interface 228.

The input/output interface 228 is connected to a USB, Institute of Electrical and Electronics Engineers (IEEE) 1394, or other peripheral equipment interface, a communication section 232 formed of a wired or wireless local area network (LAN) network interface, a storage section 234 such as a hard disk drive or a non-volatile memory, an output section 236 for outputting data to a display device such as the head-mounted display 100, an input section 238 for inputting data from the head-mounted display 100, and a recording medium drive section 240 for driving a removable recording medium such as a magnetic disk, an optical disk, or a semiconductor memory.

The CPU 222 provides overall control of the information processing apparatus 200 by executing an operating system stored in the storage section 234. The CPU 222 also executes various programs that are read from a removable recording medium and loaded into the main memory 226 or downloaded through the communication section 232. The GPU 224 functions as a geometry engine and as a rendering processor, performs a drawing process in accordance with a drawing instruction from the CPU 222, and stores a display image in a frame buffer (not depicted). The GPU 224 then converts the display image stored in the frame buffer to a video signal, and outputs the video signal to the output section 236. The main memory 226 is formed of a random-access memory (RAM) to store programs and data necessary for processing.

Figure 5:
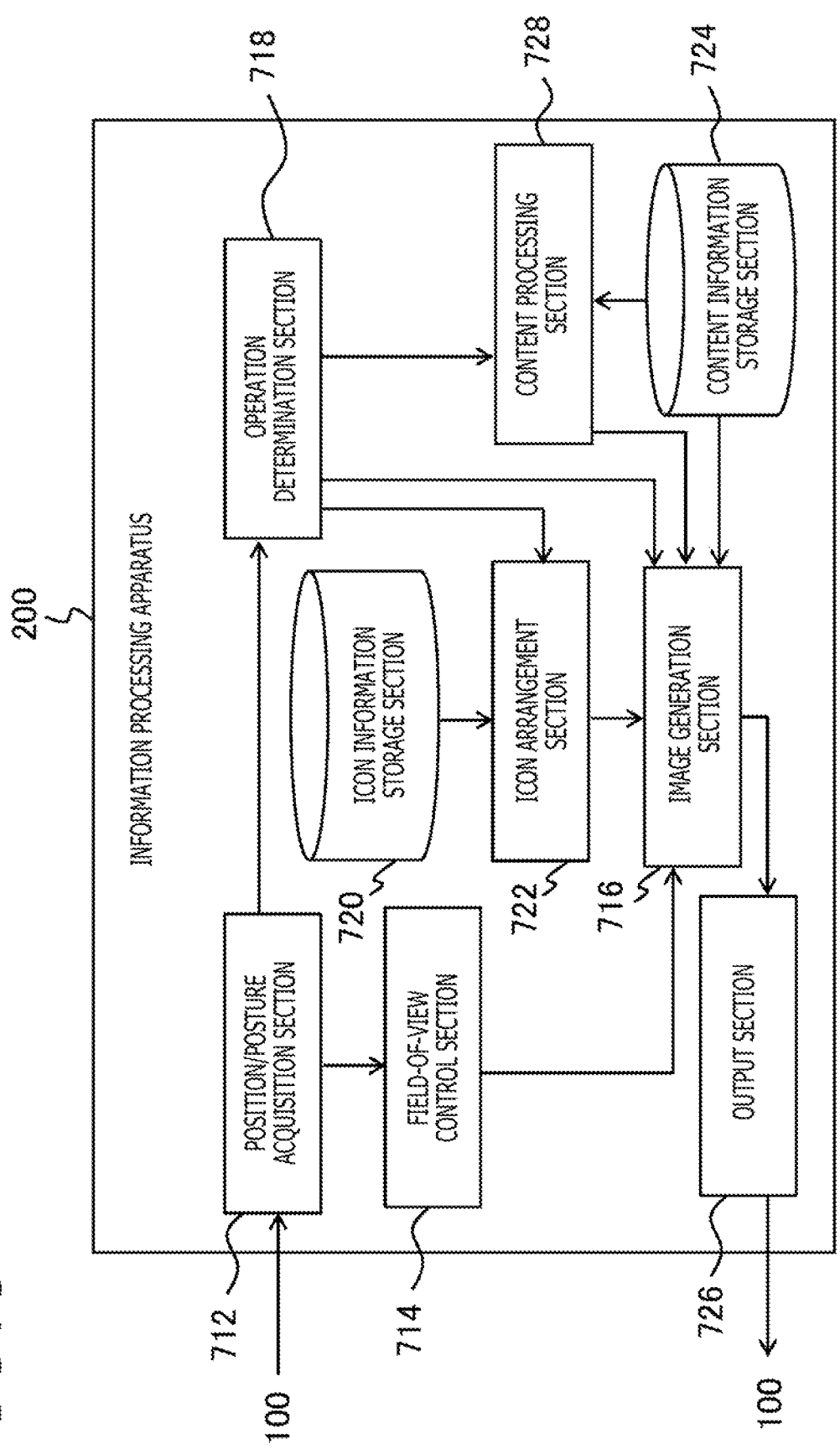
FIG. 5 a diagram illustrating functional blocks of the information processing apparatus according to the embodiment.

FIG. 5 illustrates functional blocks of the information processing apparatus 200 according to the present embodiment. The information processing apparatus 200 according to the present embodiment changes the field of view in accordance with the movement of the line of sight as mentioned earlier, and generates a screen that receives an input for selecting one of a plurality of options in accordance with the line of sight (hereinafter referred to as the "menu screen"). The information processing apparatus 200 then receives such a selection input to the menu screen and performs a process indicated by the selection input. The process to be performed based on a selection is not specifically limited. However, it is assumed here as an example that a process handling a game, a moving image, or other electronic content is performed. The menu screen depicts an array of icons representative of various electronic content.

At least some of the functions of the information processing apparatus 200, which are illustrated in FIG. 5, may be implemented by the control section 10 of the head-mounted display 100. Alternatively, at least some of the functions of the information processing apparatus 200 may be implemented by a server that is connected to the information processing apparatus 200 through a network. As another alternative, a menu screen control apparatus capable of generating the menu screen and receiving the selection input may be employed separately from an apparatus for processing electronic content.

FIG. 5 is a block diagram focused on functions that are incorporated in the information processing apparatus 200 and mainly related to menu screen control. The functional blocks illustrated in FIG. 5 can be implemented by hardware such as the CPU, GPU, and memories depicted in FIG. 4, and implemented by software such as programs for performing data input, data retention, image processing, communication, and other functions loaded into a memory, for example, from a recording medium. Thus, it will be understood by those skilled in the art that the functional blocks may be variously implemented by hardware only, by software only, or by a combination of hardware and software. The method of implementing the functional blocks is not specifically limited.

The information processing apparatus 200 includes a position/posture acquisition section 712, a field-of-view control section 714, an icon information storage section 720, an icon arrangement section 722, an operation determination section 718, a content processing section 728, an image generation section 716, a content information storage section 724, and an output section 726. The position/posture acquisition section 712 acquires the position and posture of the head-mounted display 100. The field-of-view control section 714 controls the field of view of a display image in accordance with the user's line of sight. The icon information storage section 720 stores information related to icons to be displayed. The icon arrangement section 722 determines the arrangement of icons in a virtual space. The operation determination section 718 determines that an operation is performed by a change in the line of sight. The content processing section 728 processes selected electronic content. The image generation section 716 generates data for a display image. The content information storage section 724 stores information related to content to be selected. The output section 726 outputs the generated data.

Based on a value detected by the motion sensor 64 of the head-mounted display 100, the position/posture acquisition section 712 acquires at a predetermined rate the position and posture of the user's head on which the head-mounted display 100 is mounted. In accordance with an image captured by an imaging device (not depicted) connected to the information processing apparatus 200, the position/posture acquisition section 712 may further acquire the position and posture of the head and integrate the result of acquisition with the information acquired by the motion sensor.

Based on the position and posture of the head, which are acquired by the position/posture acquisition section 712, the field-of-view control section 714 sets a field-of-view plane (screen) with respect to a three-dimensional space to be drawn. The menu screen according to the present embodiment illustrates on-screen icons in such a manner that the icons seem to be floating in a virtual space. Therefore, the field-of-view control section 714 retains information related to a virtual three-dimensional space for arranging the icons.

Except for icons, no particular items to be depicted in the virtual space are specifically predefined. However, for example, a plane or object depicting a background may be defined in the global coordinate system similarly for general computer graphics. For example, an omnidirectional background object sized to encompass the icons floating in the air and the user's head may be disposed. This creates a sense of depth within the space and enhances the impression of the icons floating in the air. The field-of-view control section 714 then sets screen coordinates with respect to the global coordinates at a predetermined rate based on the posture of the head-mounted display 100.

The direction in which the user faces is determined by the posture of the head-mounted display 100, that is, the Euler angles of the user's head. In order to assure that the virtual space is drawn on a screen plane within a field of view based on the direction in which the user faces, the field-of-view control section 714 sets at least the screen coordinates in accordance with the direction in which the user faces. In this instance, the normal vector of the user's face is roughly estimated to be the direction of the line of sight.

More detailed line-of-sight information can be acquired by using a device capable of detecting a gaze point in accordance, for example, with the reflection of infrared light. The following description assumes that the direction of the "line of sight" generically denotes an estimated or detected direction in which the user faces no matter what derivation method is used. In order to prevent an image from being unintentionally blurred, the field-of-view control section 714 may ignore angular changes detected before a predetermined value is exceeded by a change in the posture of the user's head. Further, in a situation where a zoom operation on a displayed image is to be received, the field-of-view control section 714 may adjust the sensitivity of head angle detection in accordance with the zoom magnification.

The icon arrangement section 722 determines the arrangement of icons representative of various electronic content. As mentioned earlier, the icons are depicted in such a manner that they seem to be floating in a virtual space. More specifically, the icons are arranged horizontally in the same horizontal plane with or in the vicinity of the line of sight of the user facing forward (in the horizontal direction). As a result, the icons can be selected based on the motion of the user shaking the user's head from side to side. It is assumed that the icons are spherical or other objects representative of thumbnail images of various electronic content.

The icon information storage section 720 stores information related to the shapes of the icons and the electronic content to be iconified. Based on the information stored in the icon information storage section 720, the icon arrangement section 722 identifies the number of icons to be displayed, and optimizes the pattern and scope of arrangement in accordance with the identified number of icons. Although details will be given later, optimization is achieved, for example, by vertically displacing the center positions of the icons in consideration of the permissible scope of icon arrangement in a virtual space and the number of icons to be displayed. As a result, a large number of icons can be disposed at an appropriate distance from each other and efficiently selected.

Further, in response to a user operation, the icon arrangement section 722 displaces such an arrangement of icons within a virtual space without changing the sequence of the icons. That is to say, the icon arrangement section 722 displaces the arrangement itself in a global coordinate system. As a result, even when the employed arrangement includes many icons, relevant icons can be positioned within an easily viewable range, that is, for example, in front of the user. The icon arrangement section 722 associates identification information related to content with the information related to the arrangement of icons representative of the content, and supplies information related to the association to the image generation section 716.

The operation determination section 718 checks the movement of the user's line of sight to determine whether or not an operation other than a field-of-view change in the menu screen is performed. The operation to be determined here is, for example, the selection of an icon, the reproduction of electronic content associated with a selected icon, the start of processing, a download, an information display operation, a display screen transition to an associated web site, and the display of help information. When, for example, the line of sight reaches one of the arranged icons, the operation determination section 718 determines that the icon is selected. Accordingly, an operating control button is additionally displayed to prompt for selecting an operation on the associated content. When the line of sight is directed toward the displayed operating control button, it is determined that the operation is performed.

The operation determination section 718 retains criteria for performing the above-described process and setup information related to a process to be performed accordingly. If the operation is determined to have been performed and an additional operating control button or other object needs to be displayed on the menu screen, the operation determination section 718 issues a request to the image generation section 716 in order to notify that such an additional object should be displayed on the menu screen. Even in a different situation where processing is to be completed within a virtual space for the menu screen, that is, if, for example, an operation is performed to display an overview of selected content or display help information related to the menu screen, the operation determination section 718 issues a relevant processing request to the image generation section 716.

If an operation is performed to start the reproduction or processing of electronic content, switch to the display of a web site, or otherwise switch from the display of a virtual space for the menu screen, the operation determination section 718 issues a relevant request to the content processing section 728. The operation determination section 718 further determines whether or not an operation is performed to displace the arrangement of icons. If an operation is performed to displace the arrangement of icons, the operation determination section 718 issues a relevant request to the icon arrangement section 722.

The image generation section 716 draws at a predetermined rate an image to be displayed as the menu screen by projecting a virtual space containing the arrangement of icons determined by the icon arrangement section 722 onto a screen determined by the field-of-view control section 714. As mentioned earlier, an object other than the arrangement of icons, such as a background object, may exist in the virtual space. The image generation section 716 may change a texture image of the background object so that the thumbnail image of a selected icon, that is, an icon reached by the line of sight, is displayed over the entire background.

The image generation section 716 may generate a menu screen image in such a manner that it is stereoscopically viewable on the head-mounted display 100. That is to say, a left-eye parallax image and a right-eye parallax image may be generated and displayed individually in the left and right regions of the screen of the head-mounted display 100. Further, the image generation section 716 varies a displayed image in compliance with a request from the operation determination section 718. For example, the image generation section 716 enlarges a displayed selected icon, and displays an operating control button near such an icon in order to receive a specific operation.

Alternatively, the image generation section 716 displays, for example, text information for giving an overview of content or help information related to the menu screen. The text information related to various content and thumbnail images and other data used for the drawing of icons and background are stored in the content information storage section 724 in association with the identification information related to the content. Alternatively, such text information and data may be acquired directly from a server connected through a network. When an omnidirectional background object is to be disposed as mentioned earlier, the content information storage section 724 should store panoramic image data that is prepared in association with various electronic content or prepared for the menu screen.

A panoramic image is an example of an image depicting a space around a fixed point. An omnidirectional panoramic image depicts a surrounding space (panoramic space) in the form of a sphere. A background image may be formed of prepared moving image content or still image content or formed of rendered computer graphics.

The content processing section 728 processes electronic content associated with a selected icon in compliance with a request from the operation determination section 718. That is to say, the content processing section 728 reproduces a moving or still image or starts a game. Data and programs for such electronic content processing should be stored in the content information storage section 724 in association with the identification information related to the content. The image generation section 716 also generates a moving image and an image for displaying a game screen and other content in compliance with a request from the content processing section 728. General techniques are applicable to detailed processing of content and thus will not be described here.

The output section 726 transmits, at a predetermined rate, data on an image generated by the image generation section 716 to the head-mounted display 100. The output section 726 may further output acoustic data such as music for the menu screen and sound included in various content.

Figure 6:
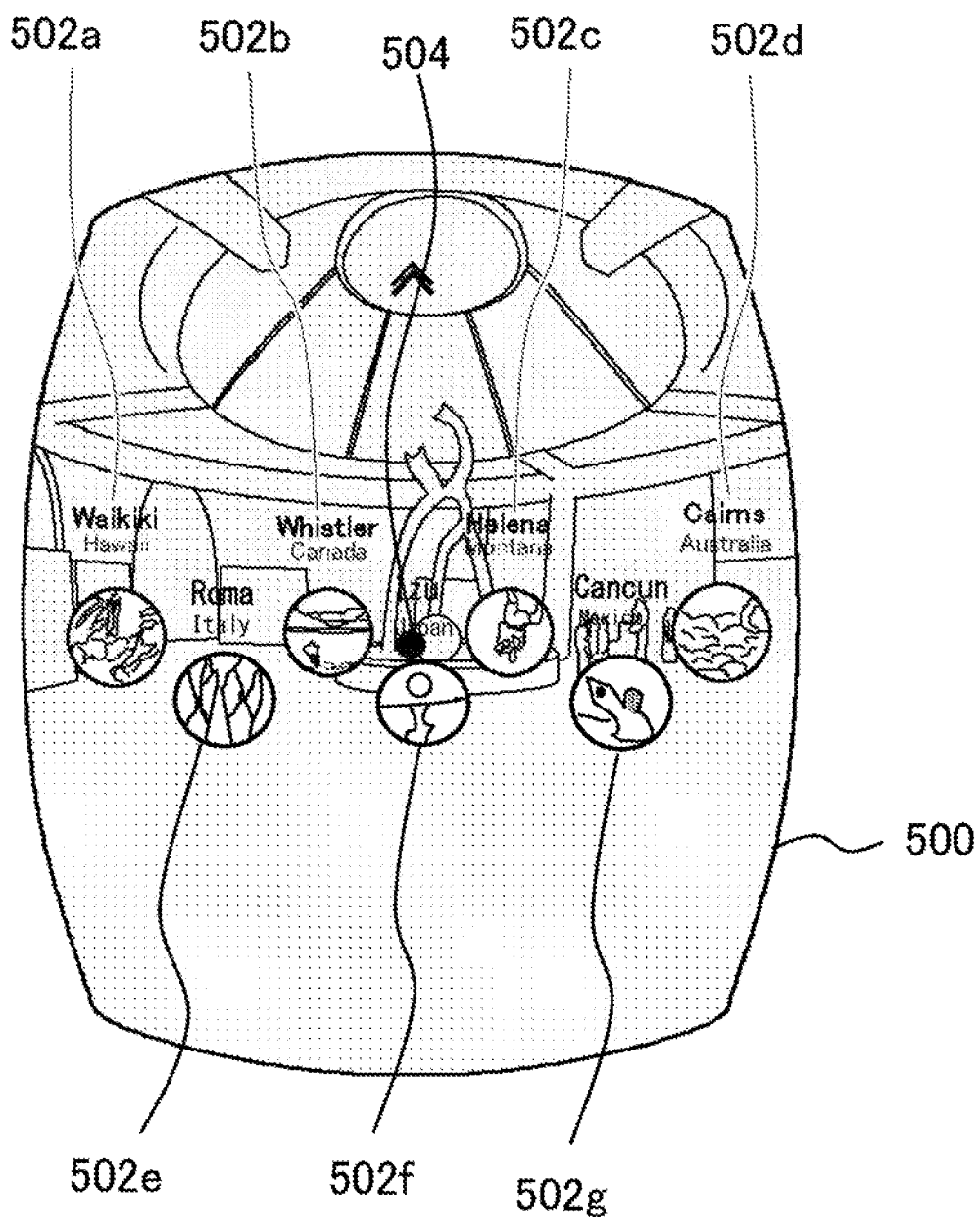
FIG. 6 is a diagram illustrating a menu screen that is displayed in the embodiment.

FIG. 6 illustrates a menu screen displayed on the head-mounted display 100. The menu screen 500 depicts objects in the field of view corresponding to the user's line of sight, which are included in a virtual space built around the user. Therefore, the menu screen 500 displays icons 502a to 502g located in the field of view, which are included among a plurality of icons arranged by the icon arrangement section 722. Text information, such as the title of content represented by an icon, is displayed above each icon 502a to 502g. The user can view a desired icon by shaking the user's head from side to side as needed to move the line of sight and thus the field of view.

An object representative of a background is also drawn behind the icons 502a to 502g. When an omnidirectional background object is used as mentioned earlier, a texture image attached to it is depicted to create a sense of depth. As a result, staging effects are produced so that the icons 502a to 502g seem to be floating in a space encompassed by the background object. In the illustrated example, the icons 502a to 502g are spherical objects that are obtained by texture mapping the thumbnail images of the electronic content. It should be noted, however, that the icons are not limited to a spherical shape.

The menu screen 500 further displays a cursor 504 indicative of a point of intersection between an image plane and the user's line of sight, that is, the user's point of view of the menu screen. As mentioned earlier, the field of view of the menu screen 500 changes with the movement of the line of sight. As a result, the cursor 504 indicative of the point of view remains substantially at the center of the menu screen 500 without regard to the movement of the line of sight. That is to say, the field of view changes with a change in the direction of the user's line of sight. Therefore, the cursor 504 remains in a fixed position on the screen, and a virtual world including the arranged icons and the background object becomes relatively displaced in an opposite direction.

The cursor 504 notifies the user of a position that is recognized as the point of view by the information processing apparatus 200, and enables the user to intuitively adjust the degree of shaking of the user's head, thereby permitting the user to accurately operate a desired icon or a desired operating control button. In that sense, the cursor 504 need not precisely coincide with the user's point of view. Further, the cursor 504 may deviate from the center of the screen depending, for example, on the speed of line-of-sight movement.

The menu screen 500 may further display an additional object (not depicted). For example, an operating control button for displaying help information may be disposed at the bottom of a virtual world to appear on the screen and receive an operation when the line of sight is directed downward.

Figure 7:
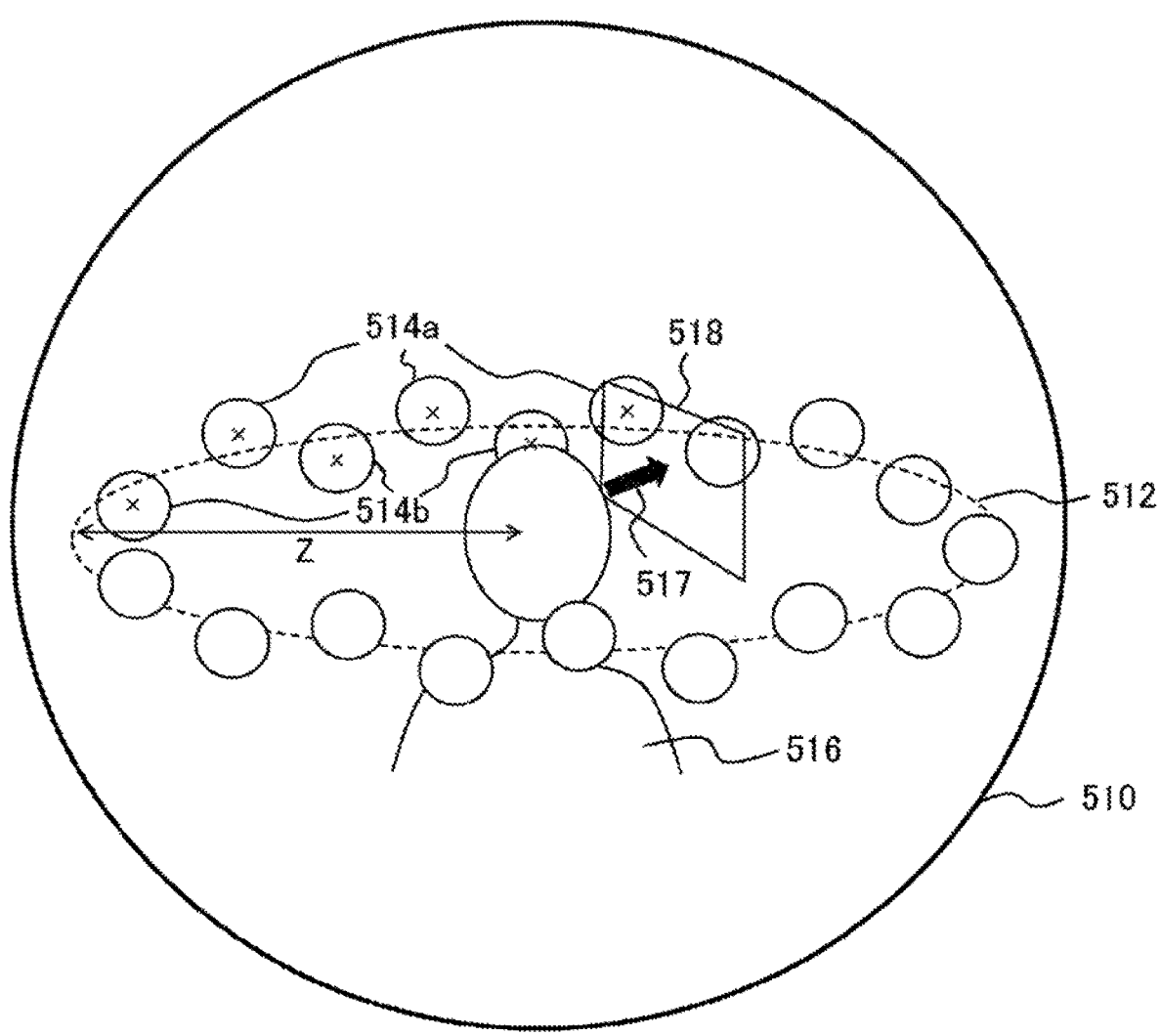
FIG. 7 is a schematic diagram illustrating an example of a virtual space that is built when a menu image is generated in accordance with the embodiment.

FIG. 7 schematically illustrates an example of a virtual space that is built when a menu image is generated. In the virtual space, as mentioned earlier, the icons are horizontally arranged on the basis of a horizontal plane crossing the head of a user 516, that is, for example, a horizontal plane including a line-of-sight vector prevailing when the user 516 faces forward. In the example of FIG. 7, the icons (e.g., icons 514a and 514b) are regularly arranged so as to cross a circumference 512 having a predetermined radius Z around the user's head.

Further, a spherical surface 510 around the head of the user 516 is set as a background object. The direction in which the user faces (a normal vector 517 of the user's face) is identified as the line of sight, a screen 518 is set in a vertical plane around the line of sight, and an object in the virtual space is projected onto the screen 518. As a result, the menu screen 500 depicted in FIG. 6 is drawn.

As mentioned earlier, the icon arrangement section 722 optimizes the arrangement of icons depending on the situation. The simplest arrangement would be obtained by arranging all the icons in a line (in a circular line) so that the center of each icon is positioned on the circumference 512. All the icons may be arranged at equal intervals. Alternatively, the icons may be preferentially disposed forward of the user.

Meanwhile, in a situation where the icons are arranged around the user's head, the number of icons displayable at a time is naturally limited because the range of arrangement is determined by the length of the circumference 512. Increasing the radius Z lengthens the circumference so that an increased number of icons can be arranged. However, such an increase in the number of icons reduces the apparent size of each icon and the region where text information can be displayed. This leads to reduced viewability.

Under the above circumstances, the upper limit on the number of displayable icons is increased by arranging the icons in such a manner that the center of at least one icon is vertically displaced from the center of another icon. In the example of FIG. 7, the icons 514a whose centers marked x are positioned above the circumference 512 and the icons 514b whose centers marked x are positioned below the circumference 512 are alternately disposed. That is to say, the vertical positions are alternately changed. As a result, even if the radius Z is left unchanged and the icons are disposed at substantially equal intervals, the upper limit on the number of displayable icons can be increased by approximately 50% as compared to a case where the icons are arranged in a line.

Figure 8:
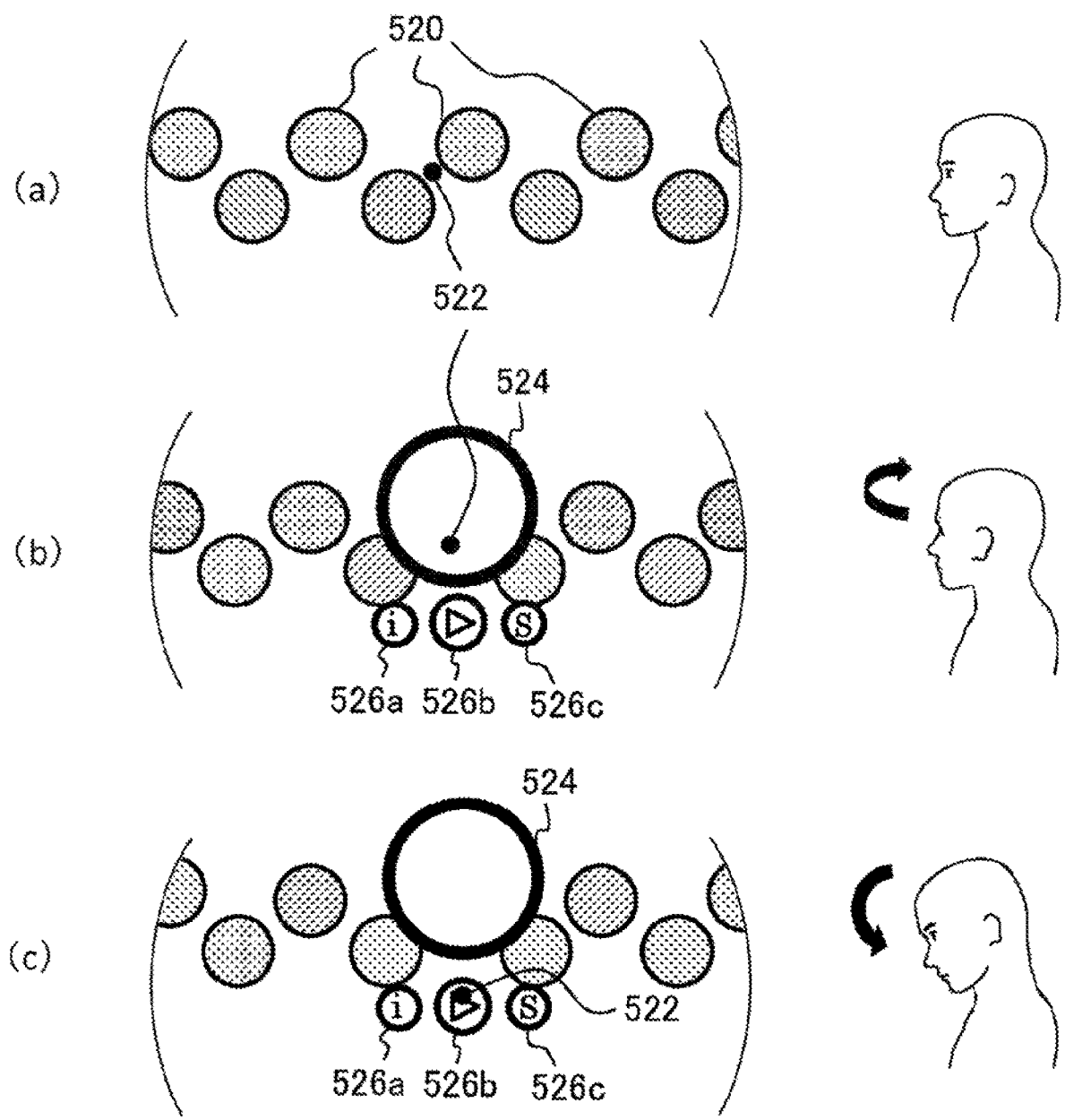
FIG. 8 depicts a set of diagrams illustrating exemplary menu screen transitions in the embodiment that are based on line-of-sight movement.

FIG. 8 illustrates exemplary menu screen transitions based on the movement of the line of sight. The left side of FIG. 8 illustrates only the arrangement of icons displayed on the menu screen, and the right side of FIG. 8 illustrates a left side view of the user's head. The screen illustrated by an upper portion (a) of FIG. 8 displays the arrangement of icons 520 depicted in the aforementioned manner and a cursor 522 indicative of the user's point of view. As described with reference to FIG. 7, the icons 520 in a virtual space are disposed to surround the user's head at the height of the line of sight prevailing when the user faces forward.

As a result, while the user faces forward as depicted at right in FIG. 8, the vertical center of the arranged icons is at substantially the same height as the cursor 522 indicative of the user's point of view. In a state indicated at (a) in FIG. 8, all the icons are unselected and of the same size because the cursor 522 does not overlap with the icons 520. The virtual distance between the user and the icons 520 is furthest at the center of the screen. In a strict sense, therefore, the displayed icons 520 are variously sized depending on such distance. However, such a difference in size is ignored here. This also holds true in the subsequent drawings.

When the user shakes the user's head slightly rightward, that is, moves the line of sight to the right, the field of view of the screen accordingly moves to the right. As a result, as illustrated by a middle portion (b) of FIG. 8, the position of the cursor 522 on the screen remains unchanged, but the arranged icons relatively move to the left. Obviously, if the line of sight is moved to the left, the arranged icons on the screen move to the right. When the cursor overlaps with a certain icon 524 due to such movement, the icon 524 is magnified to indicate that it is selected.

When the icon 524 is selected, operating control buttons are additionally displayed below the selected icon 524. Various operating control buttons may be displayed in accordance with the type of content represented by the selected icon. However, FIG. 8 assumes that moving image content is represented by the selected icon, and illustrates three operating control buttons, namely, an information display button 526a, a reproduction start button 526b, and an associated web site display button 526c (hereinafter may be generically referred to as the "operating control buttons 526"). When the user nods or otherwise moves the line of sight downward in the above state, the field of view of the screen accordingly moves downward.

As a result, as illustrated by a lower portion (c) of FIG. 8, the position of the cursor 522 on the screen remains unchanged, but the arranged icons relatively move upward. When this causes the cursor 522 to overlap with a certain operating control button 526, an operation assigned to the operating control button is received. In the example of FIG. 8, the cursor 522 overlaps with the reproduction start button 526b. Therefore, a reproduction start operation for the moving image content represented by the selected icon 524 is received to start a reproduction process. In this instance, the displayed menu screen is replaced by a moving image. Therefore, the displayed moving image is controlled by the content processing section 728.

If the cursor 522 overlaps with the information display button 526a, the head-mounted display 100 switches to the display of text information for giving an overview of the moving image in the same virtual space as for the menu screen. If the cursor 522 overlaps with the associated web site display button 526c, the head-mounted display 100 switches to the display of an associated web site by connecting to a server offering the web site. As another operating control button, a button for downloading electronic content represented by a selected icon may be displayed.

When the operating control buttons 526 appear below and near the selected icon 524 as illustrated, various operations can be performed with a reduced amount of labor while maintaining continuity with an icon selection. As a result, the operating control buttons 526 may overlap with unselected icons. However, the unselected icons are made unselectable while the operating control buttons are displayed. This ensures that an operation on an operating control button takes precedence.

Certain conditions may be set for validating an operation on an operating control button and starting an associated process. For example, an operation on an operating control button may be determined to be valid on condition that a predetermined period of time has elapsed since the cursor 522 overlapped with the operating control button. In such an instance, when the cursor 522 overlaps with the operating control button, an indicator may be separately displayed to indicate the length of time remaining before the operation becomes valid. This addresses the problem where the cursor accidentally overlaps with an operating control button due to slight movement of the user's head and frequently starts an unintended process. Further, even if the cursor 522 is intentionally moved to an operating control button, a certain amount of time is available to achieve cancellation before the start of a process.

When the configuration illustrated in FIG. 8 is employed, one of a large number of arranged icons can be selected by shaking the user's head from side to side. Further, when the user nods, various operations can be performed on content represented by the selected icon. In general, shaking the head from side to side and nodding impose a lighter burden than looking upward irrespective of the posture. Therefore, as far as the icons are horizontally arranged to match left/right head shaking over an increased variable range in a situation where the operating control buttons are displayed below the icons only when an operation is intended, an increased number of icons are made selectable and an intuitive operation can be smoothly performed.

FIG. 9 schematically illustrates the relationship between icon arrangement and point-of-view movement. Circularly shaped icons in FIG. 9 represent some of the icons arranged in a virtual space. In reality, however, the icons may be disposed on a circumference surrounding the user's head as illustrated in FIG. 7. Further, FIG. 9 uses broken-line arrows to indicate the path of the cursor that moves with respect to the arrangement of icons when the user's head is shaken from side to side. An upper portion (a) of FIG. 9 illustrates a state where the icons are arranged in a line. In this case, all the icons can be sequentially selected simply by turning the face to the left or to the right.

Meanwhile, a middle portion (b) of FIG. 9 illustrates a case where the center positions of the icons are vertically displaced as mentioned earlier, and particularly the upper and lower icons are alternately disposed. In this configuration, a larger number of icons can be disposed within a predetermined range than in the case illustrated at (a) in FIG. 9. Further, as illustrated in FIG. 9, a radius r of the icons and a vertical displacement $\Delta C$ between the upper and lower icons are determined so that all the icons overlap with the same horizontal plane, that is, the relational expression $2r > \Delta C > 0$ is satisfied. However, if the icons are not spherically shaped, the radius r is replaced by half the vertical length of the icons.

When the above configuration is employed, all the icons can be sequentially selected simply by turning the face to the left or to the right (path M). Meanwhile, only the upper icons can be sequentially selected by orienting the head slightly upward and turning the face to the left or to the right (path U), and only the lower icons can be sequentially selected by orienting the head slightly downward and turning the face to the left or to the right (path L). Obviously, the line of sight can be obliquely moved in the middle of the path U, M, or L in order to switch to a different path. That is to say, when the icons are arranged as illustrated at (b) in FIG. 9, it is possible not only to increase the number of displayable icons, but also to efficiently select a desired icon by narrowing down on selection targets by moving the head slightly in a vertical direction.

Although the upper and lower icons are alternately disposed at (b) in FIG. 9, similar effect is obtained when the upper and lower icons are not alternately disposed as illustrated by a lower portion (c) of FIG. 9. However, the largest number of icons can be displayed at a time when the icons are disposed as illustrated at (b) in FIG. 9. Based on the number of icons to be displayed, the icon arrangement section 722 may optimize the arrangement of icons by selecting a pattern of icon display, for example, selecting pattern (a), (b), or (c) in FIG. 9, adjusting the spacing intervals between the icons, and changing the range of icon display. For example, if a small number of icons are to be displayed, pattern (a) can be selected to arrange the icons sequentially in front of the user.

If a certain number of icons are to be additionally displayed after the icons are already displayed 360 degrees around the user due to an increase in the number of icons, pattern (b) can be selected to display the newly added icons compactly in front of the user. Alternatively, only the newly added icons may be displaced and displayed as indicated by pattern (c). However, the present embodiment is not limited to such an arrangement pattern, and pattern (b) may be initially adopted. Whether an icon is disposed at an upper level or at a lower level may be determined according to the type of content represented by the icon. Further, the icons may be disposed at three or more different levels depending on the case.

As described above, the present embodiment disposes the icons around the user's head in a virtual space in order to make a larger number of pieces of content available as options. Therefore, the present embodiment permits the user to perform simpler and more intuitive operations than establishing a complicated information system. Meanwhile, when the icons are disposed behind the user, the user needs to look back in order to visually recognize the icons. If a seated user tries to look back, such a twisting motion may place a burden on the user. In view of such circumstances, the present embodiment further permits an operation to be performed to displace the arrangement of icons in a virtual space.

FIG. 10 illustrates exemplary menu screen transitions including icon arrangement displacement operations. The left side of FIG. 10 illustrates only an icon arrangement portion of the menu screen, whereas the right side illustrates the direction in which the user faces and a downward view of the arranged icons in a virtual space. An upper portion (a) of FIG. 10 illustrates a situation where, as described earlier, the on-screen field-of-view changes as the user faces leftward or rightward, a displayed icon with which the cursor 530 overlaps is enlarged, and operating control buttons are displayed below the enlarged icon.

A downward view of the virtual space indicates that icons 534 are disposed on a circumference surrounding the user's head, and that only icons within the user's field of view are to be displayed. In the downward view, icons to be displayed are marked by a thick-line circle, icons to be not displayed are marked by a broken-line circle, and the user's line of sight is marked by a white arrow. When building a virtual space, the field-of-view control section 714 disposes displacement buttons 536a and 536b on a circumference on which the icons are to be disposed. The displacement buttons 536a and 536b are used to displace the arranged icons. The displacement buttons 536a and 536b on the icon arrangement circumference are disposed, for example, at opposing ends of an angular range θ within which the user can easily turn the user's face.

In the above instance, the angular range θ is centered with respect to a direction corresponding to forward of the user and wider than a viewing angle of the menu screen. In a state illustrated at (a) in FIG. 10, it is assumed that the user faces substantially forward. Therefore, the displacement buttons 536a and 536b are positioned outside the field of view and not displayed. However, if, for example, the user shakes the user's head to the right, one displacement button 536a soon comes into the field of view as illustrated by a middle portion (b) of FIG. 10. When the displacement button 536a is disposed toward the user rather than the icon arrangement, the displacement button 536a is displayed over the icons.

In a state illustrated at (b) in FIG. 10, the cursor 530 has not reached the displacement button 536a. Therefore, as is the case with (a) in FIG. 10, icons positioned to the left of the displacement button 536a are selectable. When the head is further shaken to the right until the cursor 530 overlaps with the displacement button 536a as illustrated by a lower portion (c) of FIG. 10, a displacement function is enabled to displace the arrangement of icons. More specifically, the arrangement of icons is rotated in a horizontal plane around the user's head.

While the cursor 530 overlaps with the displacement button 536a, the arrangement of icons is continuously rotated. Consequently, as indicated by a black circle in the downward view, an icon 538 positioned behind the user in the state illustrated at (b) in FIG. 10 can be moved to the front of the user in a state illustrated at (c) in FIG. 10. FIG. 10 illustrates a case where the head is shaken to the right. However, the same holds true even when the head is shaken to the left. As a result, the user is able to select the icons disposed 360 degrees around the user simply by shaking the user's head without twisting the user's body or changing the direction in which the user stands.

As the angular range θ within which the displacement buttons 536a and 536b are disposed, the range of angles at which the line of sight can be comfortably changed should be determined, for example, by conducting an experiment. The angular range θ may be varied depending on a possible user state, for example, depending on whether or not the user is seated. While the cursor 530 overlaps with the displacement button 536a and the arrangement of icons is being displaced as indicated on the screen depicted at (c) in FIG. 10, icons that have passed the displacement button 536a are selectable. In this instance, icons with which the displacement button 536a overlaps and the subsequent icons are made, for example, translucent to indicate that they are unselectable.

In FIG. 10, invalid icons are shaded darker than valid icons. When a desired icon comes into the field of view and becomes valid as a result of the above-described icon arrangement displacement, the desired icon can be selected as indicated on the screen depicted at (b) in FIG. 10 by removing the cursor 530 from the displacement button 536a. An operation for removing the cursor 530 from the displacement button 536a is performed by moving the cursor in a direction opposite to the direction in which the cursor 530 is placed over the displacement button 536a. That is to say, in the example of FIG. 10, such operation is achieved by shaking the head to the left.

Operations of a menu image generation apparatus that can be implemented by the above-described configuration will now be described. FIG. 11 is a flowchart illustrating processing steps that are performed by the information processing apparatus 200 in order to generate a menu screen and receive a selection operation. Processing indicated in the flowchart starts when, for example, the user wears the head-mounted display 100 and turns on the information processing apparatus 200. First of all, based on the icon information stored in the icon information storage section 720, the icon arrangement section 722 in the information processing apparatus 200 identifies the number of pieces of content for which icons are to be displayed, and accordingly determines the arrangement of icons in a virtual space (step S10).

Meanwhile, the field-of-view control section 714 defines the virtual space containing, for example, a background object, and determines the field-of-view plane (screen) with respect to the virtual space in accordance with the position and posture of the user's head. The image generation section 716 draws the menu screen by projecting the virtual space containing the arrangement of icons onto the screen (step S12). A common computer graphics technology can be applied to the drawing process. Further, the image generation section 716 displays the cursor representative of the user's point of view over the menu screen.

As basic subsequent operations, the field-of-view control section 714 changes the screen in accordance with a change in the posture of the user's head, and the image generation section 716 repeats the process of drawing an image on the screen. As the output section 726 sequentially outputs generated image data to the head-mounted display 100, the menu screen is dynamically depicted in accordance with the movement of the line of sight.

If, in the above state, the operation determination section 718 determines that the cursor overlaps with a displayed icon ("Y" at step S14), the image generation section 716 enlarges the displayed icon as it is selected (step S16). The image generation section 716 then displays predetermined operating control buttons below the enlarged icon (step S18). In this instance, the image of the background object may be simultaneously updated to match the selected icon.

If the user nods in the above state, the cursor moves to an operating control button ("Y" at step S20). If, for example, a predetermined period of time elapses and an operation on the operating control button is determined to be valid ("Y" at step S22), the operation determination section 718 requests the image generation section 716 or the content processing section 728 to perform a process associated with the type of operated operating control button. The associated process is then performed (step S24).

If the cursor does not move to a displayed operating control button (step S18, "N" at step S20) or if the cursor placed over a displayed operating control button is not validated and is removed ("Y" at step S20, "N" at step S22), only the drawing process in step S12 continues. If the cursor is not only removed from an operating control button but also removed from an icon over which the cursor is placed in step S14, the processes in steps S16 and S18 are performed in a backward fashion (not depicted). That is to say, the operating control button becomes hidden, and the icon reverts to the previous size.

Each time the cursor overlaps with an icon, the processes in steps S16 and S18 are both performed on the icon. As a result, if the line of sight is moved so as to cross the arrangement of icons as illustrated in FIG. 9, the icons increase and decrease their size one after another. If the user's head is shaken to a greater extent to place the cursor over a displacement button ("N" at step S14, "Y" at step S30), the operation determination section 718 determines that the cursor over the displacement button, and the icon arrangement section 722 displaces the arrangement of icons in the virtual space (step S32).

As far as the cursor is placed over the displacement button ("N" at step S14, "Y" at step S30), the icon arrangement section 722 continues to displace (rotate) the arrangement of icons, and the image generation section 716 continues to draw the resulting pattern (steps S32 and S12). If the cursor is not placed over an icon, an operating control button, or a displacement button, the image generation section 716 draws the arrangement of icons only in accordance with a change in the field of view ("N" at step S14, "N" at step S30, step S12).

Meanwhile, if an operation is performed to return to the menu screen after a process for an operating control button is performed, the image generation section 716 resumes the process of drawing the menu screen ("Y" at step S26, step S12). If, by contrast, the operation for returning to the menu screen is not performed, the image generation section 716 or the content processing section 728 continues with the ongoing process ("N" at step S26, "N" at step S28, step S24). However, if such processing needs to be stopped due, for instance, to a user operation, the information processing apparatus 200 terminates the entire process ("Y" at step S28).

According to the present embodiment described above, the menu screen receiving a selection input from a plurality of icons is depicted as a virtual space where the field of view changes with a change in the direction in which the user faces and with a change in the user's line of sight. In this instance, the icons are arranged in parallel with a horizontal plane of the virtual space so that an icon can be selected by shaking the head to the left or to the right in order to move the line of sight. Further, operating control buttons are displayed below the selected icon in order to receive a detailed operation on the selected icon. As a result, a large number of icons can be selected at a glance and operated by reasonable movement.

In the above instance, when the icons are disposed in parallel with the horizontal plane and vertically displaced from each other, an increased number of icons can be arranged at an easy-to-view distance while unique staging effects are produced so that the icons seem to be floating around the user. Further, the pattern of icon arrangement and the range of icon arrangement can be optimized in accordance with the number of icons to be displayed. Furthermore, when an employed pattern is such that the icons are vertically displaced from each other, the icon radius and the degree of icon displacement are determined so that the upper and lower icons both cross the same horizontal plane. As a result, as in the case of icons arranged in a line, the icons are sequentially selected simply by shaking the head from side to side. Thus, the operating procedures to be performed are easily understandable. Moreover, when the icons are vertically displaced from each other, only the upper or lower icons can be made selectable by slightly adjusting the vertical angle at which the user's head is tilted. This increases the efficiency of selection.

In addition, when the icons are arranged to surround the user, an operation for rotating the arrangement of icons is received. As a result, icons positioned behind the user or placed in a position that the user cannot easily face can be placed in an easily accessible range. This reduces the burden on the user. Further, when the displacement buttons for performing such an operation are disposed as objects as in the case of arranged icons, no additional operating procedure need be learned. Thus, the displacement operations can easily be performed in a manner similar to that of icon selection.

As described above, the present embodiment makes it possible to perform a sophisticated selection operation by moving the line of sight with respect to a virtual space. Therefore, the present embodiment is particularly effective when an input device of a head-mounted display or other hardware is difficult to operate. Further, if content selected in the above manner provides the sense of immersion, the selection operation can be performed by using an expression suitable for a view of the world of the content.

The present invention has been described in terms of an embodiment. The embodiment is illustrative and not restrictive. Persons of skill in the art will appreciate that variations may be made by variously combining the elements and processes described in conjunction with the embodiment without departing from the scope and spirit of the present invention.

REFERENCE SIGNS LIST

10 Control section, 20 Input interface, 30 Output interface, 32 Backlight, 40 Communication control section, 42 Network adapter, 44 Antenna, 50 Storage section, 64 Motion sensor, 70 External input/output terminal interface, 72 External memory, 80 Clock section, 100 Head-mounted display, 200 Information processing apparatus, 222 CPU, 224 GPU, 226 Main memory, 712 Position/posture acquisition section, 714 Field-of-view control section, 716 Image generation section, 718 Operation determination section, 720 Icon information storage section, 722 Icon arrangement section, 724 Content information storage section, 726 Output section, 728 Content processing section.

INDUSTRIAL APPLICABILITY

As described above, the present invention is applicable to a game machine, an information processing apparatus, an image display device, and a system including one of them.

The invention claimed is:

1. An information processing apparatus that generates a menu screen including a plurality of icons and receives a selection operation performed by a user, the information processing apparatus comprising:
an icon arrangement section that arranges the icons in a virtual space;
a field-of-view control section that acquires posture information related to a head of the user and determines a field-of-view plane with respect to the virtual space in accordance with the acquired posture information;
an image generation section that draws an image to be projected into the virtual space with respect to the field-of-view plane, generates the menu screen over which a cursor indicating point of view of the user is displayed, and outputs the generated menu screen to a display device; and
an operation determination section that identifies an operation in accordance with a positional relationship between the cursor and the icons and other object images drawn on the menu screen,
wherein the icon arrangement section arranges the icons in a horizontal direction of the virtual space in such a manner that a center of a first icon is vertically displaced from a center of a second icon,
wherein the icon arrangement section determines the amount of displacement in such a manner that all the icons cross a same horizontal plane, and
wherein a portion of the first icon and a portion of the second icon cross the same horizontal plane.

2. The information processing apparatus according to claim 1,
wherein the icon arrangement section arranges the icons in such a manner that the icons cross a circumference around the head of the user in the virtual space.

3. The information processing apparatus according to claim 1,
wherein the icon arrangement section alternately arranges upper and lower icons that are vertically displaced from each other by a predetermined amount of displacement,
wherein the center of the first icon is above the same vertical plane, and
wherein the center of the second icon is below the same vertical plane.

4. The information processing apparatus according to claim 1,
wherein the icon arrangement section determines in accordance with the number of icons whether or not to vertically displace the arranged icons from each other.

5. The information processing apparatus according to claim 1,
wherein the field-of-view control section disposes a first displacement button and a second displacement button at a predetermined position in a horizontal direction in which the icons are arranged, the first displacement button receiving an operation for displacing the arranged icons in the virtual space,
when the cursor overlaps with the first displacement button, the operation determination section determines that the displacement operation is being performed, and,
while the displacement operation is being performed, the icon arrangement section displaces the arranged icons in a predetermined direction,
wherein an angular separation between the first displacement button and the second displacement button is greater than an angle occupied by the image such that the first displacement button and the second displacement button are not viewable simultaneously.

6. The information processing apparatus according to claim 1,
wherein, when the cursor overlaps with one of the icons, the operation determination section determines that the icon is selected, and
the image generation section additionally displays an operating control button below the selected icon in order to receive an operation on content represented by the selected icon.

7. An operation reception method that is applied by an information processing apparatus that generates a menu screen including a plurality of icons and receives a selection operation performed by a user, the operation reception method comprising:
arranging the icons in a virtual space;
acquiring posture information related to a head of the user and determining a field-of-view plane with respect to the virtual space in accordance with the acquired posture information;
drawing an image to be projected into the virtual space with respect to the field-of-view plane, generating the menu screen over which a cursor indicating point of view of the user is displayed, and outputting the generated menu screen to a display device; and
identifying an operation in accordance with a positional relationship between the cursor and the icons and other object images drawn on the menu screen,
wherein the arranging the icons is arranging the icons in a horizontal direction of the virtual space in such a manner that a center of at a first icon is vertically displaced from a center of a second icon, wherein the icon arrangement section determines the amount of displacement in a such a manner that the icons cross a same horizontal plane, and wherein a portion of the first icon and a portion of the second icon cross the same horizontal plane.

8. A non-transitory computer readable medium having stored thereon a computer program designed for a computer that generates a menu screen including a plurality of icons and receives a selection operation performed by a user, the computer program comprising:

by an icon arrangement section, arranging the icons in a virtual space;

by a field-of-view control section, acquiring posture information related to a head of the user and determining a field-of-view plane with respect to the virtual space in accordance with the acquired posture information;

by an image generation section, drawing an image to be projected into the virtual space with respect to the field-of-view plane, generating the menu screen over which a cursor indicating point of view of the user is displayed, and outputting the generated menu screen to a display device; and by an operation determination section, identifying an operation in accordance with a positional relationship between the cursor and the icons and other object images drawn on the menu screen, wherein the arranging the icons is arranging the icons in a horizontal direction of the virtual space in such a manner that a center of at a first icon is vertically displaced front a center of a second icon, wherein the icon arrangement section determines the amount of displacement in such a manner that all the icons cross a same horizontal plane, and wherein a portion of the first icon and a portion of the second icon cross the same horizontal plane.

* * * * *